Patented June 8, 1937

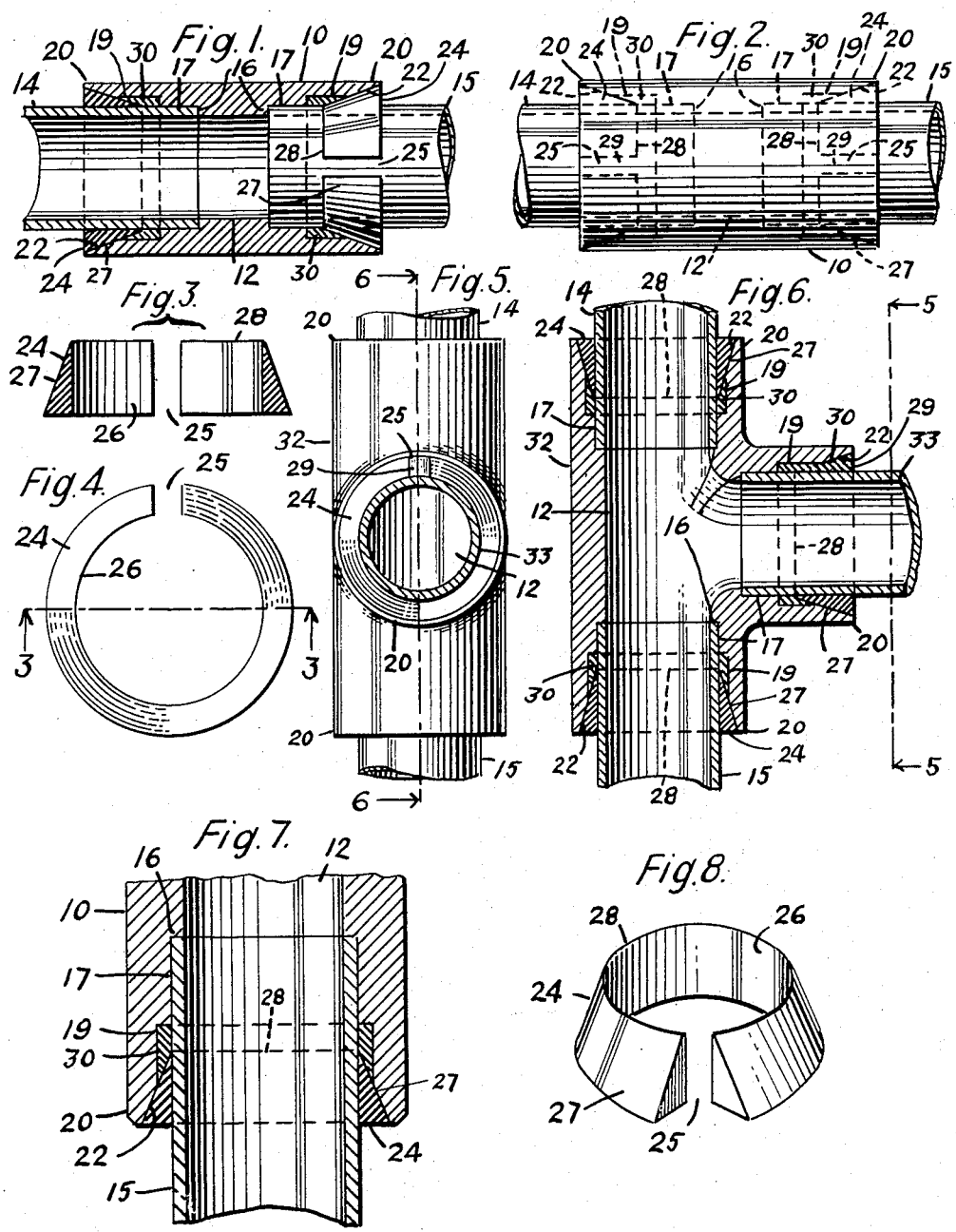

2,083,528

UNITED STATES PATENT OFFICE 2,083,528

CONNECTER

William J. Burkart, Greensburg, Pa., assignor to Thomas Hahessey, Pittsburgh, Pa.

Application June 30, 1934, Serial No. 733,175

10 Claims. (Cl. 285—115)

My invention relates to connecters for, and to the method of, connecting pipe and rod-like elements.

In devices, such as couplings, L's, T's, end caps, plugs, sockets, supports and other fittings, for pipe or rod-like elements, the pipe or rod and the connecter or fitting elements have had complementary screw threads for connecting them together, such as to require relative turning of the elements, and usually a sealing medium therebetween, thereby frequently rendering the assembly of difficult attainment merely by the nature of the elements, or by the position in which the assembly is to be made, by interference from adjacent objects, or for other reasons, and sometimes also rendering the seal uncertain or ineffective.

It is among the objects of the invention to avoid such objectionable features, and to provide a connecter that is easy to install, and a method of connecting it that is easy to practice, without turning the elements, and irrespective of the position of the installation or the adjacency of surrounding objects, and that shall ensure an effective seal.

Connecters, on the order of pipe fittings and free from screw threads, have been suggested, but any of these, of which I am aware, have been complicated and weak in construction, expensive to manufacture, difficult of installation, ineffective in operation, or subject to other objections.

It is another object of the invention to overcome such objections and to provide a threadless connecter that is simple and durable in construction, economical to manufacture, easy to install, effective in its operation, and free from other objections to the prior devices.

Prominent among the other objections to the prior threadless connecters, in general, is the inability properly to hold the parts together, while effecting the connection, to produce a perfect seal, particularly in association with connecters or couplings employing a hardening liquid seal, such as solder, the latter often being subject to stress, by movement of the parts during assembly, to render its sealing qualities imperfect.

Such connecters are also difficult to install, and cannot be installed in certain positions without depending upon capillary attraction, which renders the connecters ineffective, particularly those of large size.

It is an object of the invention to overcome this objection by holding, and providing means for so holding, the elements being assembled that the seal takes a substantially perfect set, in any one of a greater variety of positions, and irrespective of its size.

As an illustrative embodiment of the invention, not intended as representing its only form or limiting the invention to the particular structure, which is given merely by way of example, a hollow member, such as a pipe coupling, is provided with an inner pipe element end abutment, a bore for closely fitting the pipe adjacent to the abutment, a radially extending bore outwardly of the first bore and constituting a chamber, and an annular preferably sloping or tapered surface at the mouth of the coupling. A ring-like structure, which may be a complete ring with an axial hole or holes, a split ring, the split of which constitutes a passageway, as will herein appear, or a ring-like series of perimetrally spaced elements, is placed around the pipe. The pipe is placed in the coupling to fit the smaller bore in position against the abutment. The ring-like structure is moved along the pipe into the coupling mouth, into wedging position between the coupling and the pipe, or in substantially equivalently tightly held relation thereto, forcibly reacting between these members to force them to, and hold them in, coaxial operative position. It thus operates as a temporary means for tightly holding the coupling and the pipe together. Subsequently, and preferably while the coupling is heated, a fusible body, or hardening sealing liquid, is introduced through the entrance to the coupling, preferably through the opening or openings, such as the split in the ring or wedge structure, into the larger bore or chamber of the coupling, and, by reason of the fact that the ring is holding the coupling and the pipe rigidly together, the solder or other liquid sets without disturbance, in contact with the coupling, the pipe and the ring, thus rendering the temporary holding means or ring a permanent part of the connecter. The liquid might be introduced through a hole in the coupling, and a solid ring employed, but, with the entrance for the liquid in the ring, the location of the entrance for the liquid is subject to the control of the operator, and may be located on the top side of the connecter or coupling, permitting the liquid to flow in by gravity, which would not be true of a hole in the coupling which is a part of a Y, T, YY, or similar fitting, in certain installations, and besides, the coupling is rendered stronger, and the rings having the splits or openings therein are more readily produced than in the fittings, which are of more complicated design than the ring.

The principle of the method and structure applies to structures of various kinds where plug and socket-like elements, such as a coupling and a pipe, or elements which are brought together for like connection; the invention being further explained and illustrated in the following description and in the accompanying drawing, in which:

Figure 1 is a side view, partially in section and partially in elevation, of a pipe coupling embodying the invention;

Fig. 2 is a view, in side elevation, of the device of Fig. 1;

Fig. 3 is a detail view, on an enlarged scale, of a split ring-like wedge structure or holding member constituting part of the invention, taken along the line 3—3 of Fig. 4;

Fig. 4 is an end view of the structure of Fig. 3;

Fig. 5 is a view, taken substantially along the line 5—5 of Fig. 6, of the invention, as applied to a T-connecter for pipes or conduits;

Fig. 6 is a view taken substantially along the line 6—6 of Fig. 5;

Fig. 7 is an enlarged view, in section, of a fragmentary portion of the structure, as seen in Figs. 1 and 6, showing more clearly certain elements thereof, and Fig. 8 is a perspective view of the structure of Figs. 3 and 4.

Referring to Figs. 1 to 4, 7 and 8, a coupling member 10, or coupling body proper, preferably of metal and in the form of a short tube or conduit, has a central bore 12 preferably of the same diameter as the internal diameter of pipe sections 14 and 15 that are to be connected or coupled thereby. Bore sections 17, preferably of larger diameter than the central bore 12, extend oppositely therefrom to closely telescope or fit the pipe sections 14 and 15 whereby to provide inner holding portions for these sections. This change in diameter between the bores 12 and 17 provides shoulders or abutments 16, against which the ends of the pipe sections 14 and 15 are placed.

From the outer ends of the sections 17, sections 19 extend farther outwardly towards the ends of the coupling body 10, these sections preferably being in the form of enlarged bores or of radially extended character relative to the section 17, although capable of other shapes, since, in this form, they do not fit the pipe section, but are provided to form chambers for a sealing medium, as will hereinafter be set forth. The chamber portions 19 extend along the coupling body 10 from the outer ends of the pipe-fitting bore sections 17 to outer or mouth-end portions 20 having tapered or sloping inner surfaces 22 preferably, and as shown, in the form of outwardly diverging annuli or frusto-conical portions constituting wedge or holding seats.

As best shown in Figs. 3, 4 and 8, a split-ring-like structure 24 is of tapered or wedge shape in axial peripheral section, having a split 25, an inner surface 26 substantially conforming to the inner surface 22 of the mouth end 20 of the coupling body 10, and ending in an inner feather edge 28. The split may be replaced by a like axial hole through a solid or complete ring, since it constitutes merely an entrance to the chamber portion 19, after it is in place. In such aspect, the ring structure itself may, therefore, also take other shapes, such as a series of spaced ring-like sections or wedges around the pipe sections to provide one or more entrances to the chamber 19; its principal function, in one aspect of the invention, being to space the coupling and the pipe sections radially, whereby to hold the coupling and the pipes in axial alignment. However, for simplicity and ease of manufacture, the form shown is preferred. It also serves as a spacer or filler at the end of the coupling to protect the seal, and to close the joint between the coupling elements, except for the opening provided by the split 25.

In assembling the parts, a ring 24 is preferably first placed or telescoped over the end of one of the pipe sections 14 and 15, and the latter placed in the coupling, as shown. The ring is subsequently moved along the pipe and driven against the surface 22, to effect a wedge fit therewith, after which the parts, in certain instances, may desirably be heated for the reception of the liquid, although heating is not necessary in all cases.

This operation centralizes the pipe section and the coupling for the reception, through the entrance or split 25, of a hardening sealing liquid which fills the chamber 19 and freezes as a body 30 in intimate contact with the adjacent surfaces of the coupling, the pipes and the ring. It may also be supplied to fill the entrance or split 25, as indicated by a portion 29 thereof, whereby to complete the ring and to prevent its contraction, where the split form of ring is employed.

As so constructed, the parts are rigidly and accurately held, without the necessity for skilled work on the part of the operator, until the sealing medium 30, which in this case preferably is solder, sets, and provides a joint which is simple and easy to manufacture, assemble and install, is economical to manufacture, is effective and durable and has other advantages rendering it an improvement in its field.

It is contemplated that materials other than solder may be employed, depending on the size of the parts, the service to which the fitting is to be put, the choice of the operator and other factors consistent with the invention in its other features.

In Figs. 5 and 6, in which corresponding parts are designated by corresponding reference characters, the application of the parts 12 to 30, inclusive, to a T-connecter 32 for an additional pipe section 33, is shown; this form merely exemplifying the adaptation of the device to further like fittings or telescopic parts, such as L's or elbows, taps, end caps, plugs, sockets and a wide variety of like structures not deemed necessary of illustration, and although I have shown and described particular forms of the invention, changes may be effected therein without departing from the spirit and scope thereof, as set forth in the appended claims.

I claim as my invention:

1. A connecter comprising a hollow member having successively inwardly, from an element-receiving entrance, an inwardly-converging tapered perimetral inner surface, a perimetral chamber portion at the inner end of said tapered surface larger in diameter than the element, and an element-fitting section extending inwardly from said chamber portion to an abutment for the end of the element, and a split ring-like structure of wedge-like axial perimetral section substantially conforming at its outer surface to said tapered surface and at its inner surface to the outer surface of the element wedged longitudinally inwardly against said tapered and element surfaces with its inner end in said chamber around the element, the split in the ring constituting an entrance for a hardening sealing liquid into said chamber portion.

2. A connecter comprising a hollow member having successively inwardly, from an element-receiving entrance, an inwardly converging tapered perimetral inner surface, a perimetral chamber portion at the inner end of said tapered surface larger in diameter than the element, and an element-fitting section extending inwardly from said chamber portion to an abutment for the end of the element, and a ring-like structure of wedge-like axial perimetral section substantially conforming at its outer surface to said tapered surface and at its inner surface to the outer surface of the element wedged axially inwardly against said tapered and element surfaces around the element outwardly of said chamber portion and providing an entrance for a hardening liquid into said chamber portion.

3. A connecter comprising a hollow member having successively inwardly, from an element-receiving entrance thereto, a perimetral inner wedge-receiving surface, a perimetral chamber portion inwardly of said surface larger in diameter than the element, and an element-fitting section inwardly of said chamber portion, and a ring-like structure for position around the element wedged axially inwardly against said surface outwardly of said chamber portion against the element, the connecter providing for the reception of a hardening liquid into said chamber portion.

4. A connecter comprising a hollow fitting member including an entrance for a pipe-like element and having a radially-extended mouth, a ring-like structure for position around the element and axial movement thereon into said mouth for radial holding position between the member and the element, said member and said ring, in said position of the ring, forming a chamber inwardly of the ring about the element therebetween, and said ring providing an entrance to said chamber for a solder-like liquid, and a solder-like body in said chamber for sealing and securing the member and the ring to each other and to the element.

5. A connecter comprising a hollow member having an element-receiving entrance and an inner abutment for an end of the element, a section longitudinally fitting the element extending outwardly from the abutment, a portion of enlarged bore extending outwardly from said section and a flaring mouth at the outer end of said bore, an element having a longitudinal section in said hollow member and an end against said abutment, a split ring wedged between the hollow member and the element around the element in said mouth outwardly of said bore, the split of the ring constituting an entrance for solder into said bore, and a body of solder filling the bore and the split of the ring.

6. A pipe-joint connecter comprising a tubular fitting having portions of substantially the inner and outer diameters, respectively, of a pipe to be received in the fitting in abutting end relation to an annular shoulder between said portions inwardly from an entrance to the fitting for the pipe, the fitting having outwardly toward said entrance from said shoulder a portion of further enlarged interior diameter, and a ring-like element to be mounted around the pipe for sliding movement therealong into said further-enlarged portion after the adjacent pipe end is moved into said entrance for position against said shoulder, the element and said further-enlarged portion providing, when the element is in said further-enlarged portion, a chamber between the fitting and the element, and the element having an aperture for receiving into said chamber a hardening liquid capable of adhering to the fitting and to the ring-like element.

7. A connecter comprising a tubular portion having successively inwardly from an element-receiving entrance thereto a perimetral wedge-receiving seat, a perimetral chamber portion inwardly of said seat larger in diameter than the element, and an element-fitting section inwardly of said chamber portion, and a structure for position on the outer perimeter of the element wedged axially inwardly against said seat outwardly of said chamber portion and pressing against the element, the connecter providing for the reception in said chamber portion of a fusible body for embracing the element and for adherence to the tubular portion and the element.

8. A connecter comprising a tubular portion having successively inwardly from an element-receiving entrance thereto a perimetral inner wedge-receiving seat, a perimetral chamber portion inwardly of said seat larger in diameter than the element, and an element-fitting section inwardly of said chamber portion, and a ring-like structure for position around the element wedged axially inwardly against said seat outwardly of said chamber portion against the element and having a surface structure adapted for adherence to a fusible body, the connecter providing for the reception of a fusible body into said chamber portion.

9. Means for forming a tube joint comprising tubular portions for adjacent substantially axially-alined end-to-end relation, and an element for position adjacent to said ends about said axis and cooperating with the tubular portions to form a substantially enclosed perimetral chamber and an entrance to the chamber for a hardening liquid, said element being movable relative to the tubular portions for placing the entrance at any selected position about said axis and adapted for rigid holding relation to each of the tubular portions in the selected position to hold the tubular portions temporarily in fixed relation to each other for the reception through said entrance of the liquid into said chamber to permanently hold the tubular portions in said fixed relation.

10. Means for forming a tube joint comprising tubular members for adjacent substantially axially-alined end-to-end relation, at least one of said tubular members having a wedge-receiving portion and an element for position adjacent to said ends about said axis and cooperating with the tubular members to form a perimetral enclosed chamber and an entrance to the chamber for a hardening liquid, said element being adapted for cooperation with the other tubular member and including a wedge portion for cooperation with the wedge-receiving portion of said one tubular member to temporarily hold the tubular members in rigid relation to each other for the reception of the liquid into the chamber to permanently hold the tubular members in said rigid relation.

WILLIAM J. BURKART.